March 11, 1969        E. J. CAIRNS        3,432,358

FUEL CELL ELECTROLYTE AND PROCESS OF USING

Filed Jan. 4, 1965

Inventor:
Elton J. Cairns,
by James M. Underwood
His Agent.

United States Patent Office 3,432,358
Patented Mar. 11, 1969

3,432,358
FUEL CELL ELECTROLYTE AND PROCESS
OF USING
Elton J. Cairns, Schenectady, N.Y., assignor to General
Electric Company, a corporation of New York
Filed Jan. 4, 1965, Ser. No. 422,903
U.S. Cl. 136—86                                    9 Claims
Int. Cl. H01m 27/14

ABSTRACT OF THE DISCLOSURE

An aqueous solution of hydrofluoric acid is used as a fuel cell electrolyte in combination with a fuel cell using a hydrocarbon fuel. In operation, the fuel cell is operated at temperature of at least 80° C., but not exceeding the boiling point of the electrolyte at the ambient pressure above the electrolyte in the fuel cell. In order to permit operation of the fuel cell at temperatures higher than the boiling point of the azeotrope of water and hydrogen fluoride, cesium fluoride or rubidium fluoride is added to the electrolyte as a suppressor of the vapor pressure of the hydrogen fluoride.

---

This invention relates to improved fuel cells and to a process of producing electrical energy from such fuel cells. More particularly, this invention relates to an improved fuel cell capable of oxidizing fluid, saturated hydrocarbon fuels completely to carbon dioxide with the production of electrical energy at current densities heretofore unobtainable with such fuels in fuel cells with either acid or alkaline electrolytes. The fuel cell comprises a pair of electrode elements in direct contact with an electrolyte which is an aqueous solution containing hydrofluoric acid. The fuel cell is operated so that the electrolyte is at a temperature of at least 80° C., but does not exceed the boiling point of the electrolyte at the ambient pressure above the electrolyte in the fuel cell.

Many types of fuel cells are proposed in the prior art, some using alkaline electrolytes, either in the molten state or as aqueous solutions, and others utilizing acidic electrolytes. The oxidant gas is usually oxygen or air and the fuels may be hydrogen, carbon monoxide, gaseous, unsaturated hydrocarbons and saturated hydrocarbons, gaseous, oxygenated hydrocarbons such as alcohols, etc. Hydrogen is usually the preferred fuel because of its greater reactivity and the only product of the cell reaction is water which must be removed by evaporation from either the basic or acidic electrolyte by circulation of the electrolyte to an evaporator external from the fuel cell, or by permitting the water to evaporate from the electrodes of the fuel cell at a controlled rate equal to the rate of formation by the cell reaction in order to maintain the concentration of the electrolyte within acceptable limits. Since variation in electrolyte composition causes variation in the performance of the fuel cell, it is highly desirable to operate the fuel cell with an invariant electrolyte, i.e., the composition remains constant. Cell performance also varies with electrolyte concentration but the effect is not noticeable as long as the concentration is maintained within narrow limits. When carbonaceous fuels including carbon monoxide and the other hydrocarbons are used as the fuel, carbon dioxide as well as water is a product of the cell reaction, providing the fuel is completely oxidized. Many of the prior art fuel cells are not capable of completely oxidizing gaseous, carbonaceous fuels, especially the hydrocarbon fuels, completely to carbon dioxide and these partially oxidized products cause loss of cell efficiency as well as operating difficulties.

In general, acidic electrolytes such as sulfuric acid and phosphoric acid have been found to be the best electrolytes to use in the low temperature range of room temperature up to about 100° C. to obtain best performance of a fuel cell using gaseous, saturated hydrocarbon fuels. Since carbon dioxide is a gas and is not reactive with these acids, its removal from the electrolyte presents no special problem, since it is more easily removed than the water.

Unfortunately, when gaseous, saturated hydrocarbon fuels, which are the most readily available and easiest to handle, are used with these acid electrolytes, prior investigators noted that there was a maximum current density which, if exceeded, caused the fuel cell to fail to produce any useful electricity. This usually occurred before the current density reached 30 milliamperes per square centimeter (ma./cm.$^2$) and always occurred before the cell had attained the maximum power capability for the operating conditions at which the cell was operated, i.e., the cell would have produced more power if it could have been operated beyond the maximum current density. Such a condition did not occur when hydrogen, oxygenated hydrocarbons or unsaturated hydrocarbons were used as fuels. Grubb in his application, Ser. No. 271,356, filed Apr. 8, 1963, and assigned to the same assignee as the present invention, discloses that saturated hydrocarbons can be used with phosphoric acid electrolytes whose concentration calculated as $P_2O_5$ is from 54–76%. When these electrolytes are used in the temperature range of from 100° C. below the boiling point, but at least 130° C., up to the boiling point of the electrolyte, the current densities obtained are higher than previously obtained with the acid electrolytes and extended the range of obtainable current densities beyond the point where maximum power is being produced in the fuel cell. However, even in this case there was a limiting current density beyond which this cell was not capable of operating.

With alkaline electrolytes, even with complete oxidation of hydrocarbons to carbon dioxide, the carbon dioxide reacts with the hydroxide type electrolyte to produce carbonates and with the carbonate type electrolytes to produce bicarbonates, causing the composition of the electrolyte to change and thus the performance of the fuel cell. Removal of carbon dioxide is the greatest problem in operating fuel cells with alkaline electrolytes on hydrocarbon fuels. Even under the best of conditions, the fuel cells using alkaline electrolytes are not as effective for the conversion of saturated hydrocarbon fuels to electricity as the fuel cells using acidic electrolytes.

Another problem has been encountered with previous fuel cells operating with liquid, alkanes, e.g., hexane, octane, etc., as fuels. When these fuel cells are on a constant load, a decay in anode potential occurs after a time dependent on the cell operating conditions. After the initial decay the anode potential recovers to its former value but additional cycles occur at more frequent intervals until finally they occur at a fairly frequent and steady period of time. The reason for this cycling is not readily understood but it would be highly desirable to be able to operate fuel cells on liquid alkanes without this variation in anode potential.

It is highly desirable to be able to operate fuel cells with fluid, saturated hydrocarbons as the fuel under conditions which permit the cell to be operated under higher current densities than heretofore attainable without encountering a maximum current density beyond which the voltage and current suddenly drops to 0 and without encountering cycling when liquid hydrocarbons are used as fuels. Unexpectedly, I have discovered that these objectives may be obtained by using an aqueous hydrofluoric acid solution as the electrotype in the fuel cell. It was indeed surprising to find that this electrolyte shows no apparent abrupt maximum current density when used with hydrocarbons as a fuel in a fuel cell. Instead, the polarization curve shows a smooth decrease of voltage as the current density increases up to the maximum capability of the fuel cell under the conditions it is being operated. Furthermore, no cycling has been observed. Although this electrolyte can be used with hydrocarbon fuels, at any temperature, above the freezing point of the electrolyte in order to obtain sufficiently high current densities at useful voltages, from the fuel cells, I have found that the temperature of the fuel cell must be at least 80° C.

Since the maximum boiling point of the aqueous solutions of hydrofluoric acid is approximately 112° C. (the boiling point of the azeotropic mixture of hydrogen fluoride and water), aqueous solutions of hydrogen fluoride alone, i.e., hydrofluoric acid, can be used in the temperature range of 80° C. up to the azeotropic boiling point at atmospheric pressure, but higher temperatures can be used if the pressure above the electrolyte is greater than the atmospheric pressure. If an aqueous solution of hydrogen fluoride is distilled, the composition of the refluxing solution will change until a constant boiling mixture containing approximately 38 mole percent hydrogen fluoride and 62 mole percent water remains at which point the constant boiling mixture distills at a temperature of approximately 112° C. at atmospheric pressure as a mixture having the same composition as that in the still pot. Various references disagree as to exact composition and boiling point of this azeotrope which, of course, does vary depending on the ambient pressure. Therefore, it is best to refer to these values as the azeotrope and the boiling point of the azeotrope at the ambient pressure. If an aqueous solution having less hydrogen fluoride than this azeotrope is used as the electrolyte in a fuel cell, the vapor escaping from the electrolyte is easily condensed and returned as a liquid so that the composition of the electrolyte remains unchanged. However, if the hydrogen fluoride concentration in the electrolyte exceeds the composition of the azeotrope, hydrogen fluoride gas will escape and can only be condensed and returned to the electrolyte by use of refrigeration.

Since a fuel cell is limited to a maximum operating temperature equal to the boiling point of the electrolyte at the ambient pressure above the electrolyte, the above limitations, dictate that when I use an electrolyte of hydrogen fluoride and water, that the fuel cell can only be operated with the composition of the electrolyte not exceeding that of the azeotrope in the temperature range of 80° C. up to the azeotropic boiling point. In this temperature range I have found that such electrolytes are very effective in fuel cells using fluid, saturated hydrocarbon fuels providing there is at least 10 mole percent hydrogen fluoride present. I have found that performance increases as the amount of hydrogen fluoride increases. Therefore, it would be desirable if the amount of hydrogen fluoride could be increased beyond that present in the azeotrope.

I have found that when cesium fluoride or rubidium fluoride, or mixtures thereof, are dissolved in the aqueous solution of hydrogen fluoride that, as one might expect there is an adverse effect on the performance of such solutions as electrolytes in a fuel cell. However, the salt does decrease the vapor pressure of the hydrogen fluoride in the solution. In fact, so much so, that if a sufficient amount of the salt is present, the solution can be evaporated to dryness to isolate the complex salts which the simple salt forms with the hydrogen fluoride.

Unexpectedly, I have found that there is a certain area of compositions of these three ingredients that permits fuel cells using these compositions as electrolytes to be operated at temperatures where they give better performance, i.e., higher current densities at a given voltage, than can be obtained with only aqueous solutions of hydrogen fluoride. Surprisingly this is not true of the other alkali metal fluorides. Sodium and lithium fluoride are not sufficiently soluble and potassium fluoride, although soluble enough and capable of forming complex salts with hydrogen fluoride, does not decrease the vapor pressure of the hydrogen fluoride sufficiently, in an aqueous solution of hydrogen fluoride, to permit fuel cells containing such solutions as electrolytes to be operated at any temperature where they will give better performance than can be obtained with aqueous hydrogen fluoride alone.

My invention will be better understood by reference to the following description taken in connection with the drawings in which.

Figure 1:
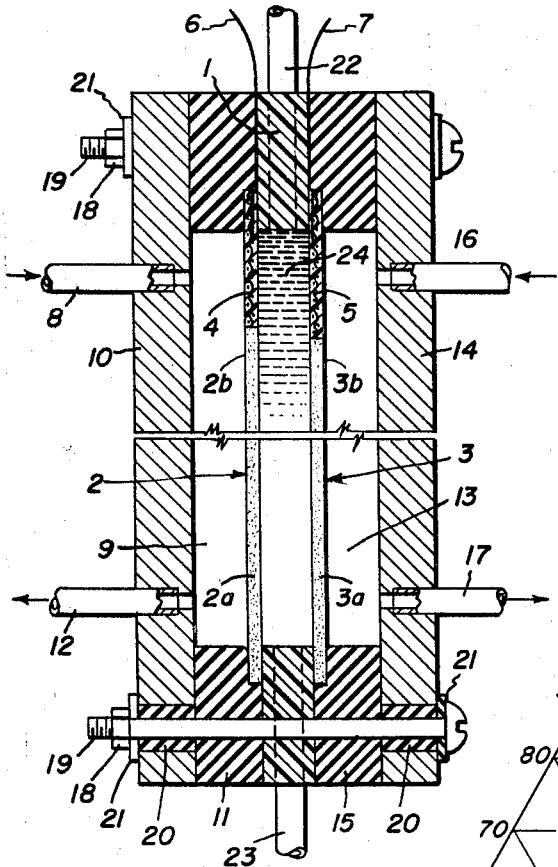
FIG. 1 is a cross-sectional view of a typical assembled fuel cell.

Although a number of different types of fuel cell electrode structures are suitable for use in the cells of the present invention, each electrode should be one which: is electronically conductive, will absorb the fuel or oxidant employed, will act as a catalyst of the electrode reaction, and will not itself be oxidized or corroded severely under the operating conditions of the cell, and which is gas-permeable, i.e., is either a porous material which allows gas to diffuse into the electrode so as to establish a three-phase boundary between the electrode, the electrolyte, and the fuel or oxidant or is a non-porous material which absorbs the fuel allowing it to diffuse through the solid material to the electrolyte-electrode interface.

Especially suitable materials include the noble metals which are gold and the noble metals of the Group VIII series of metals of the Periodic Table of Elements which are rhodium, ruthenium, palladium, osmium, iridium and platinum. Although gold is not very gas-absorbing and not as satisfactory as the other noble metals for making the anode, it does form a satisfactory cathode. Because of their ready availability and suitability, platinum and palladium are preferred. Other suitable gas-absorbing metals are known, and many are described, for example, in "Catalysts, Inorganic and Organic," Berkman, Morrel and Egloff, Reinhold Publishing Company, New York (1940); "Catalytic Chemistry," H. W. Lohse, Chemical Publishing Company, Inc., New York (1945); etc. These include other metals of the Group VIII series of metals, e.g., nickel, iron, cobalt, etc., as well as other metals known to catalytically adsorb gases, e.g., silver, copper, metals of the transition series, e.g., manganese, vanadium, rhenium, etc., but these metals under normal cell operating conditions are severely attacked by the hydrofluoric acid and therefore, in order to be used for long term cell operation, should be protected, for example, electrolytically plated or alloyed with a non-corrodable metal, e.g., platinum, palladium, etc., prior to use. In addition, the electrodes may be formed of carbon which has been activated with the noble metals of the Group VIII series, e.g., platinum and palladium.

Since the adsorption of gases on solids is a surface phenomena, it is desirable that the electrode be of the maximum practicable surface area and that the surface of the metal particles preferably be in its most active state for the adsorption of gases. For maximum cell efficiency, the maximum permissible area of one side of each electrode should be in complete contact with the aqueous hydrofluoric acid electrolyte and the maximum permissible surface of the other side of each electrode should be in contact with the fuel or oxidant gas. For these reasons, I prefer to use finely divided metal powders, having highly developed surface areas, for example, at least one square meter per gram, and preferably at least 20 square meters per gram, in fabricating my electrode structures.

Mixtures or alloys of two or more metals may also be used. For maximum cell performance, I prefer to make the electrodes by using the very active noble metal powders of the Group VIII metals, for example, platinum black, palladium black, etc.

Many ways are available for constructing the catalytically active electrodes and form no part of this invention. For example, they may be of the skeletal type obtained by forming an alloy of two metals and dissolving one of the metals leaving the other metal in a porous sheet of sufficient rigidity to use as the electrode. The metal powders may be compacted and sintered to produce the suitable electrodes having a porous nature, and if desired, can be of a multi-porous nature whereby the pores in contact with the electrolyte are smaller than the pores in contact with the fuel or oxidant gas. They may also be made by mixing metal powders with an inert binder, for example, polytetrafluorethylene, as described in the Niedrach application, Ser. No. 108,418, filed May 8, 1961, now U.S. Patent 3,297,484 and assigned to the same assignee as the present invention. A very desirable electrode structure of use in the fuel cells of my invention is made by incorporating metal powders in polytetrafluoroethylene which has an additional film of polytetrafluoroethylene without metal particles on the electrode side in contact with the fluid fuel or oxidant gas. Such a structure is more fully disclosed and claimed in the application of Niedrach and Alford Ser. No. 232,689, filed Oct. 24, 1962 and assigned to the same assignee as the present invention. The type and form of electrodes do not form a part of this invention and may be varied widely to suit the particular needs of applications of the fuel cell.

For a more complete understanding of the gaseous fuel cells of the present invention, reference is made to the drawings.

As shown in FIG. 1, the cell comprises an electrolyte chamber formed by electrodes 2 and 3 bearing against spacer 1 having ports 22 and 23 to permit filling of the electrolyte chamber with the aqueous hydrofluoric acid electrolyte 24 and also to permit circulation, if desired, of the electrolyte during the fuel cell operation from the electrolyte chamber to a reservoir (not shown). Leads 6 and 7 connected to terminal grids 4 and 5, respectively, are used to deliver electrical current to the apparatus being operated by the cell. When the fuel is a gas, it is supplied from a storage source (not shown) through inlet 8 to electrode 2, or is contained solely in chamber 9 formed by end piece 10, gasket 11 and electrode 2. A valved outlet 12, (valve not shown) is provided to exhaust any impurities or cell reaction products which enter, form or accumulate in chamber 9. When the saturated hydrocarbon fuel is a liquid, it is introduced at the bottom of the fuel chamber from a container (not shown) through the valved port 12 and allowed to overflow through port 8 to a receiver (not shown) which may be the same as the supply container, or the liquid fuel may be contained solely in chamber 9. The oxidant gas is supplied from a storage source (not shown) through inlet 16 to electrode 3 or is contained solely in chamber 13 formed by end plate 14, gasket 15 and electrode 3. A valved outlet 17 (valve not shown) is provided for the withdrawal of the impurities or cell reaction products which enter, form or accumulate in chamber 13.

The end plates 10 and 14, gaskets 11 and 15 electrodes 2 and 3 and spacer 1 are held in gas-tight relationship with each other by means of a plurality of nuts 18, insulating washers 21 and bolts 19 which have insulating sleeves 20 which concentrically fit into the holes around the periphery of end plates 10 and 14, spacer 1 and gaskets 11 and 15. Other alternative means of clamping these elements together are readily apparent to those skilled in the art. End plates 10 and 14 can be made of any material which has structural strength and can resist the corrosion conditions encountered in the cell. They may be made, for example, of metal, but are preferably made from an insulating material such as is spacer 1, e.g., polytetrafluoroethylene, vulcanized fiber, fiber or fabric-base phenolic, urea or melamine laminates, hard rubber, etc., which are capable of withstanding the temperature at which the fuel cell is operated. In such a case, insulating sleeve 20 and insulating washer 21 may be omitted. Because of their chemical inertness and their ability to withstand high temperatures, polytetrafluoroethylene and copolymers of polytetrafluoroethylene and hexafluoropropylene are ideal materials and are preferred for fabrication of end plates 10 and 14 and spacer 1. Gaskets 11 and 15 may be made from any resilient material which will effectively form a gas-tight seal around the peripheral edges of the end plates and spacer, as well as hold the electrodes 2 and 3 in liquid-tight relationship against spacer 1 and may be, for example, a resilient, rubbery type of polymer or preferably one which is not affected by the feed gases or the reaction products with which it comes in contact, and is not affected by temperature of operation of the cell, e.g., synthetic rubber elastomers such as silicone rubber, rubbery polymers of fluorinated ethylene, resilient copolymers of polytetrafluoroethylene and hexafluoropropylene, etc. Insulating sleeves 20 and insulating washers 21 may be fabricated from any of the known insulators such as used for making end plates 10 and 14 and spacer 1.

The aqueous hydrofluoric acid electrolyte 24 is shown as an aqueous solution as previously described which may be absorbed on a matrix if desired, but is preferably present as a free flowing aqueous solution, since any matrix tends to increase the internal resistance of the cell. Terminal grids 4 and 5 are illustrated as being made from metal wire screen incorporated in the electrodes which are illustrated as being made from metal powders bonded together with a synthetic polymer. This screen provides reinforcement to the electrode structure, at the same time increasing the electrical conductivity and acting a current collecting grid for supplying a path of low electrical resistance to the electrical current in the electrode. These terminal grids may, if desired, be held in contact with the surface of the electrode, but must make surface contact with the metal particles of the electrode. When electrodes 2 and 3 are made of a material which has a very low electrical resistance, for example, a porous metal structure, terminal grids 4 and 5 are not necessary and electrical leads 6 and 7 may be connected directly to electrodes 2 and 3.

When the fuel cell is to be operated on air, end plate 14 may be provided with one or more openings, or may even take the shape of spacer 1 so that air has ready access to electrode 3. In this case, gas inlet 16 and gas outlet 17 may be eliminated.

Figure 2:
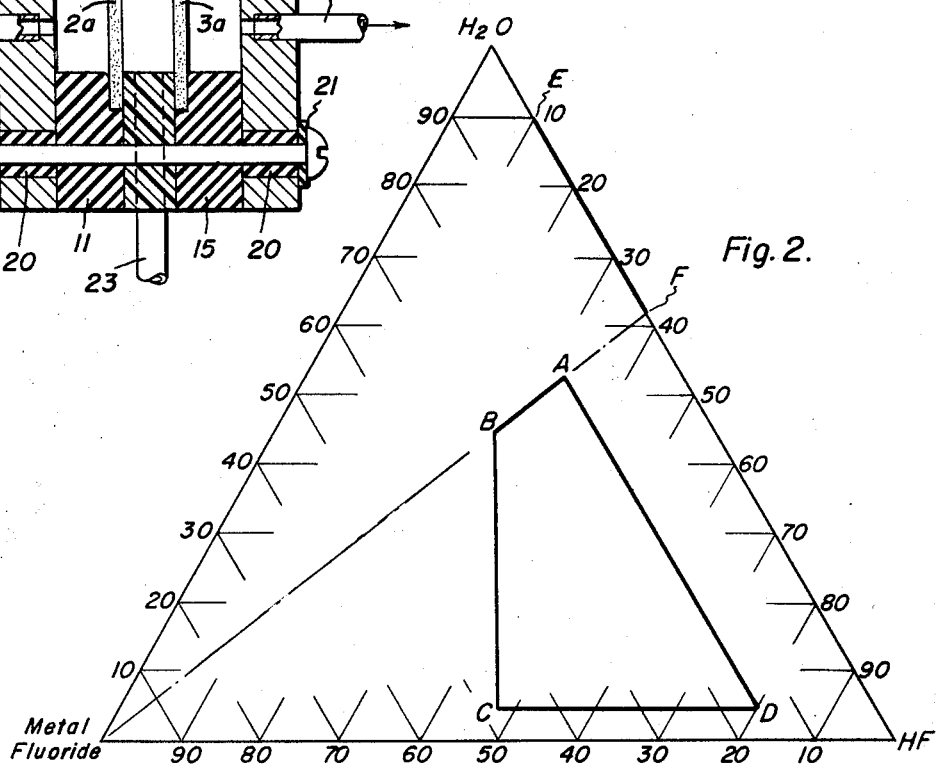
FIG. 2 is a ternary diagram of the water, hydrogen fluoride and metal fluoride system in which the compositions of the electrolyte of this invention containing these alkali metal fluorides are represented by the area enclosed by the lines AB, BC, CD and DA, and the aqueous solutions of only water and hydrogen fluoride of this invention fall on line EF.

FIG. 2 is a ternary diagram of the water, hydrogen fluoride, metal fluoride system. The area within quadrilateral ABCDA defines the compositions, on a mole percent basis, of the aqueous hydrogen fluoride electrolyte containing the metal fluoride and the line EF defines the aqueous hydrogen fluoride free of the metal fluoride useful in the fuel cells of this invention. The solid line AB represents those electrolytes having a constant hydrogen fluoride-water ratio equal to that of the azeotrope of water and hydrogen fluoride of point F. The solid line BC represents those electrolytes where the percent alkali metal fluoride equals the percent of hydrogen fluoride, i.e., those compositions in which the ratio of the percent of hydrogen fluoride divided by the sum of a percent of hydrogen fluoride and the percent of metal fluoride is 0.5. The solid line of CD represents those electrolytes having 4% water. The solid line DA represents those electrolytes having 15% of the metal fluoride. The solid line EF represents those electrolytes which are aqueous solutions of hydrogen fluoride having at least 10% hydrogen fluoride (E) up to the composition of the azeotrope. Point F as drawn, is the composition of the azeotrope at one atmosphere and would mave up slightly toward E as the pressure is increased above atmospheric. It is seen that the compositions falling within the area ABCDA may be described as aqueous hydrogen fluoride solutions whose composition, on a mole percent basis, is (A) from 4–53% water, (B) from 27–81% hydrogen fluoride, the ratio of (B) divided by the sum of (A) and (B) being at least as great as the percentage of hydrogen fluoride in the azeotrope of water and hydrogen fluoride, and (C) from 15–48%, but not in excess of the percent of hydrogen fluoride, of at least one metal fluoride selected from the group consisting of cesium fluoride and rubidium fluoride, the sum of (A), (B), and (C) being 100%. They are to be used when the temperature of the electrolyte is greater than the boiling point of the azeotrope of hydrogen fluoride and water at the ambient pressure above the electrolyte.

The composition on line EF may be described as electrolytes consisting essentially of water and hydrogen fluoride, whose hydrogen fluoride content, on a mole percentage basis, is from 10% up to the percentage of hydrogen fluoride in the azeotrope of water and hydrogen fluoride at the ambient pressure above the electrolyte. They are to be used as electrolytes in the temperature range of from 80° C. up to the boiling point of the azeotrope at the ambient pressure above the electrolyte. Both the composition of line EF and of the area ABCDA can be described as electrolytes whose composition, on a mole percentage basis, is (A) 4–90% water, (B) 10–81% hydrogen fluoride and, when the ratio of (B) divided by the sum of (A) plus (B) exceeds the percentage of hydrogen fluoride in the azeotrope of hydrogen fluoride and water, there is present, as a suppressor for the hydrogen fluoride vapor pressure, (C) 15–48%, but not exceeding the percentage of hydrogen fluoride, of at least one metal fluoride selected from the group consisting of cesium fluoride and rubidium fluoride.

Of the various alkali metal fluorides, only rubidium fluoride and cesium fluoride are sufficiently soluble in the aqueous hydrogen fluoride and form compounds with the hydrogen fluoride that are sufficiently stable that they decrease the vapor pressure of the hydrogen fluoride in the electrolyte to such a low value that the electrolytes can be used at temperatures up to boiling points as high as about 200° C. at ambient pressure without serious loss of the hydrogen fluoride.

With a fluid saturated hydrocarbon fuel, the overall cell reaction is the oxidation of the hydrocarbon to carbon dioxide and water. The respective cell reactions producing electricity at the anode 2 and cathode 3 are as follows, where methane is used as typical of the fluid saturated hydrocarbon fuels:

anode (1) 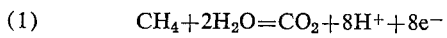
$$CH_4 + 2H_2O = CO_2 + 8H^+ + 8e^-$$

cathode (2) 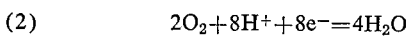
$$2O_2 + 8H^+ + 8e^- = 4H_2O$$

Typical of the various fluid saturated hydrocarbon fuels which I may use are the alkyl hydrocarbons, including cycloalkyl hydrocarbons and mixtures thereof which are gases or liquids at the temperature of the operation of the cell. Examples of such hydrocarbons are methane, ethane, propane, n-butane, iso-butane, n-heptane, iso-pentane, neo-pentane, n-hexane and its isomers, e.g., 2-methylpentane, 2,2-dimethylbutane, 2,3-dimethylbutane, 3-methylpentane, cyclohexane, n-heptane and its isomers, n-octane and its isomers, n-decane and its isomers, n-dodecane and its isomers, n-hexadecane and its isomers, n-hexacosane and its isomers, etc., including mixtures, e.g., petroleum distillates, for example, gasoline, diesel fuel, petroleum ethers, mineral spirits, etc. The only requirement for these saturated hydrocarbon fuels is that they must be fluid, i.e., either gaseous or liquid, at the cell operating temperature. Because it is easier to use fuels for the fuel cell which are liquid or gaseous at room temperature, I prefer to use such fluid, saturated hydrocarbons as the fuels for my fuel cell. However, saturated hydrocarbon fuels which are solid at room temperature but which are liquids or gases at the cell operating temperature may be melted and introduced as fluids to my fuel cell.

For any particular fuel cell, operating at a given temperature with a given composition of electrolyte, I have found that the current density at a given voltage which can be obtained from the fuel cell is dependent upon the particular fuel used. For example, the normal or straight-chain hydrocarbon fuels will produce a higher current density at a given voltage than the corresponding isomeric branch-chain or cyclic hydrocarbon. I have also found that ethane, propane and n-butane will produce a higher current density at a given voltage than the other straight-chain saturated hydrocarbons. Their performance in a fuel cell is much better, i.e., more power is produced, than with the other fuels. In order of decreasing performance the other normal hydrocarbons are in the order: pentane, methane, hexane, with the hydrocarbons above hexane showing slightly decreased cell performance with increasing number of carbon atoms. However, all of the fluid hydrocarbon fuels perform satisfactorily in my fuel cell; the only effect this order of activity has on the fuel cell is on the amount of power that can be obtained for a given size cell at a given temperature and electrolyte composition. If one desires to produce a fuel cell of a given size having a maximum current density output at a given voltage, one would use either propane or butane as the fuel. However, in those cases where it is desirable to use any of the other fluid, saturated hydrocarbon fuels, for example, it is difficult or undesirable to use a gaseous saturated hydrocarbon; the liquid hydrocarbons can be used and cell operating conditions and cell size adjusted for obtaining the desired performance from the particular fuel chosen.

From a practical standpoint, fuel cells using flat-plate type electrodes are usually constructed with both the anode and cathode electrode elements being of equal area. Since the fuel cells are constructed with various size electrode elements, a convenient basis for comparison of performance between fuel cells is to measure the performance based on the current produced for a given area of electrode. This value is known as the current density and is usually determined either in terms of milliamperes per square centimeter or amperes per square foot which is determined by dividing the total current output of the fuel cell by the dimensional area of the anode face in contact with the fuel. In the operation of a fuel cell, as the amount of current drawn from the cell increases, the current density increases in direct proportion and the voltage decreases in the manner characteristic of the fuel and its operation. A graph plotting the current density versus voltage of a fuel cell is known as a polarization curve.

With all fuel cells using either acidic or basic electrolytes, there is a rather sharp decrease in the polarization curve from the open circuit voltage (zero current) value as the amount of current supplied by the fuel cell is increased. With the best prior art electrolytes under optimum cell operating conditions, this rate of decrease becomes linear and more gradual at about 0.6 volt. After this point is reached, the current density of the cell can be increased with less of a decrease in the cell voltage than is observed at lower current densities. This linear region of the polarization curve continues as long as the fuel and oxidant can be supplied to the anode and cathode respectively, at least as fast as it is being consumed.

As can be seen from the electrode reaction equation previously given, the diffusion of a hydrocarbon fuel into the anode structure to the catalytically active metal sites, is counterbalanced by the necessity for the carbon dioxide product to diffuse out of the anode and be exhausted from the fuel chamber. At this point on the polarization curve where the current density being obtained from the cell requires the amount of fuel which is the maximum that can be diffused into the anode, the voltage will drop to zero if attempts are made to draw a higher amount of current. This is called the limiting current density. Attempts to draw a greater amount of current from the cell causes the voltage to drop to zero while the current density remains constant. This is not detrimental to the fuel cell since by decreasing the current demand, the voltage will return to the previous value for that current density at which the fuel cell is now operating.

Unfortunately, many of the prior art fuel cells reached this limiting current densities at such a low value that they were not practical or were using the catalytically active metals so inefficiently (high catalyst concentrations per unit of electrode, etc.), that the cost of the fuel cells per unit of power was too high to be practical. Further development of the prior art fuel cells led to obtaining higher current densities before reaching a limiting current density, but encountered another problem. Before the limiting current density was reached these fuel cells encountered a maximum current density beyond which the fuel cell could not be operated without deleteriously affecting future performance of the fuel cell because of an irreversible reaction. This phenomenon is a kinetic problem involving adsorption of ionic species from the electrolyte and actual oxidation of the anode. When this oxidation occurs both the voltage and current density decrease to zero. To restore such a fuel cell, it is necessary either to place the fuel cell on open circuit with the anode in contact with a gas which is active enough to reduce the oxidized anode to its former reduced state or to impress a reverse current on the fuel cell to accomplish the same effect.

Because of this potential danger to a fuel cell, it is necessary to use such a fuel cell under conditions that this maximum current density is never encountered in service. This means that fuel cells, used to run equipment which demands a starting current that is two to three times the current necessary to run it after starting, e.g., a motor, or which is subject to emergency demands for current must be used at current densities far below the maximum. I have found that my fuel cells do not encounter such a limitation and may be used at any current density up to the limiting density for the particular operating conditions chosen. This means that my fuel cells may be operated safely at much higher current densities than previously possible with those fuel cells of the prior art. This is due to the unique property, possessed only by the aqueous hydrogen fluoride electrolyte which I use. My electrolytes appear to be free of any ionic species which interfere in any way with the electrode reactions. These solutions of hydrofluoric acid are extremely stable under the fuel cell conditions and support the rapid and quantitative conversion of saturated hydrocarbons to carbon dioxide at temperatures above 80° C.

As previously mentioned, the constant boiling mixture of water and hydrogen fluoride boils at approximately 112° C. at atmospheric pressure. It can be used at higher temperatures by using superatmospheric pressure. However, it is more convenient, and a less costly fuel cell can be used, if ambient pressure is used. The aqueous solution must contain at least 10 mole percent hydrogen fluoride to be an effective electrolyte. Concentrations higher than 63 mole percent hydrogen fluoride boil below 80° C. However, concentrations higher than this can be used above 80° C., at ambient pressure by adding either cesium fluoride or rubidium fluoride, or a mixture thereof to the solution, but a minimum of 4 mole percent water is necessary to support the electrode reactions. These two fluorides form compounds with the hydrogen fluoride which are so stable that they can be isolated by evaporation of their solutions without loss of hydrogen fluoride. Providing the mole percent of cesium or rubidium fluoride does not exceed the mole percent of the hydrogen fluoride, these electrolytes are effective in fuel cells for converting saturated hydrocarbons to carbon dioxide with the concurrent production of electricity. Because they permit the fuel cells to be operated at temperatures higher than can be used with aqueous hydrogen fluoride alone at ambient pressures, the use of either or both of these two metal salts in the electrolyte allow the fuel cell to be operated under conditions which produce current densities that are even higher than can be obtained with aqueous hydrogen fluoride alone at ambient pressure. Also, at a given current density the voltage will be higher which means that the fuel cell is operating more efficiently.

When operated within the above described limits, my fuel cells can convert fluid, saturated hydrocarbon fuels directly to electricity at power levels unobtainable with any other fuel cell using any other electrolyte whether acid or basic.

Although my fuel cells may be operated at below and above ambient atmospheric conditions, there is no apparent advantage to operating at other than ambient atmospheric conditions. Subatmospheric and superatmospheric pressures cause problems of constructing and operating the fuel cell. Generally, subatmospheric pressures cause poorer cell performance than ambient atmospheric pressure. In the case of superatmospheric pressures, although generally giving better cell performance than atmospheric pressure, the gain in performance is not great enough to compensate for the added cost of construction and difficulties of operation.

The following examples are illustrative of the practice of my invention and are given by way of illustration only and not for purposes of limitation.

In general, the cells used in the following example were constructed as schematically illustrated in FIGURE 1, with some minor variations. The general shape of the fuel cell elements was round instead of square, end plates 10 and 14 and spacer 1 were all constructed of polytetrafluoroethylene and gaskets 11 and 15 were constructed as an integral part of end plates 10 and 14 by making a circular cavity in the polytetrafluoroethylene. The dimensions of the electrolyte chamber is $\frac{1}{16}''$ thick by 1.5″ in diameter, unless otherwise stated. The fuel chamber and the oxidant gas chamber are approximately 0.125 inch thick x 1.5 inches in diameter. The electrolyte chamber was connected to an air cooled condenser to return any distillate to the electrolyte chamber. A general method for making the electrode elements for the fuel cell was as follows: An aqueous suspension containing 59.6% by weight polytetrafluoroethylene was diluted with 7 volumes of water. A rigid aluminum foil was used as the casting surface on which was inscribed the ultimately desired pattern of the electrodes. The aluminum was placed on a hot plate maintained at 120–150° C. to facilitate evaporation of the water as the polytetrafluoroethylene emulsion was sprayed on it using an air brush. The desired amount of spray per unit area was then evenly distributed over the surface at a rate such that the wet areas did not accumulate and run. After the desired amount of emulsion had been sprayed into the casting surface, it was heated to 350° C. to volatilize the emulsifying agent, and to sinter the polytetrafluoroethylene particles into a coherent film. A mixture of 0.035 cc. of an aqueous emulsion containing 59.6% by weight polytetrafluoroethylene having a density of about 1.5 was mixed with 0.35 gram of finely divided platinum black along with sufficient water to make a thin cream. After a uniform blend was obtained, the mix was spread uniformly over the electrode area and placed on a hot plate to evaporate the water, and then the temperature slowly increased to a final temperature of 250–350° C. to dispel the emulsifying agent. A similar procedure was used to form a second polytetrafluoroethylene-platinum powder mix directly on another casting surface without an underlying polytetrafluoroethylene film. A screen terminal grid was cut to the desired shape and centered over the electrode pattern on one of the two casting surfaces and the other casting surface was then centered on top of the terminal grid. This assembly was placed between two press platens and molded at 350° C. for 2 minutes at a pressure of approximately 8,000 lbs./sq. in. of electrode area. Following pressing, the aluminum foil casting surfaces were dissolved from the electrodes in 20% aqueous sodium hydroxide and the electrode structures rinsed with 6 N sulfuric acid, then distilled water, and dried. By this technique electrodes were produced in which the terminal grid was sintered in the polytetrafluoroethylene-platinum mix, and the electrode was coated on one side with a pure film polytetrafluoroethylene.

Those fuels which were gases at room temperature were fed to the fuel chamber at a rate of from 1 to 10 ml. per minute. Those fuels which were liquid at room temperature but gas at the operating temperatures were vaporized in an evaporator heated to the same temperature as the fuel cell to give from 1 to 10 ml. per minute of gaseous fuel. Those fuels which were liquid at the fuel cell temperature were introduced as such into the fuel chamber and a reservoir maintained the fuel chamber full of liquid fuel. Oxygen was fed to the oxidant gas chamber at rates from 1 to 20 ml. per minute using the higher rate for the higher current densities. The flow of electrolyte changed the electrolyte in the chamber once every 1 to 5 minutes. The entire fuel cell was heated and maintained at the desired temperature in an insulated, thermostatically controlled, electrically heated chamber.

The results given in the following examples include all electrical circuit losses due to internal cell resistances. The observed current density was plotted against observed voltage and a smooth curve drawn through the results. The values reported in the tables given in the examples were read from the curve. In this way the various runs could be compared at the same current density values. I have determined by repeated tests that the curves would agree within the experimental error, and that the smoothed curve represents the average value which one would obtain in a series of runs.

In all the tables of the examples, the temperature is given in degrees centigrade and the concentration of the electrolyte is on a mole percentage basis. The voltage is given in volts and the current density is in milliamperes per square centimeter.

Example 1

This example compares the performance of propane as the fuel and oxygen as the oxidant at 95° C. in a fuel cell using the azeotrope of hydrogen fluoride and water as the electrolyte with the best performance published for this same fuel and oxidant in one fuel cell having 1 N aqueous perchloric acid at 95° C. as the electrolyte and another fuel cell having 6 N sulfuric acid at 89° C. as the electrolyte. In this example the electrolyte chamber was ⅜ inch thick. The results are shown in Table 1.

TABLE I

| Current density, ma./cm.$^2$ | Voltage | | |
|---|---|---|---|
| | HF | HClO$_4$ | H$_2$SO$_4$ |
| 0 | 0.860 | 0.900 | 0.835 |
| 5 | 0.520 | 0.590 | 0.588 |
| 10 | 0.429 | 0.490 | 0.498 |
| 20 | 0.360 | 0.420 | 0.420 |
| 30 | 0.327 | ($^1$) | ($^2$) |
| 50 | 0.260 | | |
| 70 | 0.180 | | |
| 90 | 0.110 | | |

$^1$ This fuel cell reached a maximum current density at 28 milliamperes per square centimeter.
$^2$ This fuel cell reached a maximum current density of 25 milliamperes per square centimeter.

Example 2

This example compares the hydrofluoric acid electrolyte of Example 1 with a 75% by weight aqueous phosphoric acid electrolyte both at 109° C. using propane as the fuel and oxygen as the oxidant. In this example the electrolyte chamber was ⅛ inch thick. The results are shown in Table II.

TABLE II

| Current density | Voltage | |
|---|---|---|
| | HF | H$_3$PO$_4$ |
| 0 | 0.890 | 0.890 |
| 5 | 0.553 | 0.533 |
| 10 | 0.520 | 0.484 |
| 20 | 0.473 | 0.443 |
| 30 | 0.431 | 0.402 |
| 50 | 0.351 | ($^1$) |
| 70 | 0.294 | |
| 90 | 0.156 | |

$^1$ This fuel cell reached a maximum current density at 33 milliamperes per square centimeter.

Example 3

This example compares an electrolyte of 85% by weight phosphoric acid with an electrolyte of 9.77 mole percent water with the other 90.23 mole percent being cesium fluoride and hydrogen fluoride in the ratio of 1 mole of the salt to 2.07 moles of acid, i.e., approximately 30 mole percent cesium fluoride, 60 mole percent hydrogen fluoride. The fuel was propane, the oxidant was oxygen and the temperature was 150° C. The relative efficiency with which two fuel cells convert the fuel to electricity is readily determined by the ratio of the voltage of each cell at a given current density. The fuel cell which gives the higher voltage is the more efficient. In order that any difference between the cells is not due to differences in conductivity of the electrolyte, the results given do not include the internal resistance of the cells. The results are shown in Table III.

TABLE III

| Current density, ma./cm.$^2$ | Voltage | | |
|---|---|---|---|
| | HF-CsF (A) | H$_3$PO$_4$ (B) | Ratio A/B |
| 25 | 0.646 | 0.500 | 1.29 |
| 50 | 0.573 | 0.441 | 1.29 |
| 75 | 0.522 | 0.403 | 1.29 |
| 100 | 0.482 | 0.375 | 1.29 |
| 125 | 0.440 | 0.343 | 1.28 |
| 150 | 0.417 | 0.330 | 1.26 |

Example 4

This example illustrates the use of different amounts of hydrogen fluoride in an aqueous solution and the effect of temperature on their performance as electrolytes. The fuel and oxidant were propane and oxygen respectively. Electrolyte A was 10 mole percent hydrogen fluoride. Since its boiling point is 102° C. it was used at 95° C. Electrolytes B, C and D were the azeotrope of water and hydrogen fluoride, B being used at 100° C., C at 105° C. and D at the reflux temperature of approximately 112° C. The results are shown in Table IV.

TABLE IV

| Current density | Voltage | | | |
|---|---|---|---|---|
| | A | B | C | D |
| 0 | 0.994 | 0.744 | 0.954 | 0.810 |
| 5 | 0.594 | 0.587 | 0.596 | 0.611 |
| 10 | 0.539 | 0.529 | 0.564 | 0.576 |
| 20 | 0.469 | 0.484 | 0.529 | 0.531 |
| 40 | 0.309 | 0.409 | 0.465 | 0.459 |
| 60 | 0.173 | 0.333 | 0.402 | 0.397 |
| 80 | | | 0.317 | 0.335 |
| 100 | | | 0.218 | 0.260 |

When one third of the hydrogen fluoride of electrolyte A was replaced with cesium fluoride on an equivalent basis, the performance of the fuel cell was decreased so that a current density of 40 milliamperes per square centimeter decreased the voltage to 0.139 volt.

Example 5

This example illustrates the effect of temperature and the use of cesium fluoride to decrease the vapor pressure of hydrogen fluoride whose concentration exceeds that of the azetrope of water and hydrogen fluoride. In each case the electrolyte was made up to be identical, however, analysis showed a small variation which did not significantly affect the results. They all had the same boiling point of 175° C. The actual composition of the electrolytes used at the various temperatures were: mole percent water 8.93, 120° C.; 8.1, 150° C.; 5.87, 165° C.; 7.34, 170° C. with the balance of each composition being hydrogen fluoride and cesium fluoride in which the ratio of moles of the former to moles of the latter were: 1.74, 120° C.; 1.75, 150° C.; 1.85, 165° C. and 1.76, 170° C. The fuel was propane and the oxidant was oxygen. The results are shown in Table V.

TABLE V

| Current density | Voltage | | | |
|---|---|---|---|---|
| | 120° C. | 150° C. | 165° C. | 170° C. |
| 0 | 0.921 | 0.955 | 0.077 | 0.910 |
| 10 | 0.580 | 0.635 | 0.665 | 0.672 |
| 20 | 0.479 | 0.558 | 0.565 | 0.590 |
| 50 | 0.232 | 0.424 | 0.429 | 0.452 |
| 70 | | 0.322 | 0.347 | 0.393 |
| 90 | | 0.154 | 0.267 | 0.278 |
| 100 | | | 0.195 | 0.208 |

Example 6

This example illustrates, in conjunction with the results of Example 5, that the optimum performance of any of my electrolytes is more closely related to operating temperature, being near the boiling point, than it is with the actual temperature. In general, my electrolytes should be used within 40° C. of their boiling point. The electrolyte in this case contained 14.9 mole percent water with the balance of 85.1 mole percent being a mixture in the ratio of 1 mole of cesium fluoride to 2.8 moles of hydrogen fluoride. The boiling point of this mixture is approximately 138° C. Using propane as the fuel and oxygen as the oxidant, the results at 110° C. and 130° C. are shown in Table VI.

TABLE VI

| Current density | Voltage | |
|---|---|---|
| | 110° C. | 130° C. |
| 0 | 0.890 | 0.955 |
| 5 | 0.623 | 0.650 |
| 10 | 0.566 | 0.600 |
| 20 | 0.490 | 0.535 |
| 40 | 0.378 | 0.452 |
| 60 | 0.267 | 0.356 |
| 70 | 0.230 | |
| 80 | | 0.231 |

Example 7

This example illustrates that the mole percent of cesium fluoride must be no greater than the hydrogen fluoride if power densities of at least 10 milliwatts per square centimeter are to be obtained with propane. It also illustrates typical compositions within the quadrilateral ABCDA. These electrolytes all have a boiling point of approximately 160° C. and were used at 150° C. in fuel cells using propane as fuel and oxygen as the oxidant. The compositions of the electrolytes are shown in Table VII-A and the performance in Table VII-B.

TABLE VII-A

| Electrolyte | Mole percent H₂O | Mole ratio of HF to CsF to make up balance |
|---|---|---|
| A | 35.4 | 0.82 |
| B | 27.6 | 1.08 |
| C | 37.5 | 1.34 |
| D | 13.5 | 1.62 |
| E | 4.9 | 1.65 |
| F | 9.8 | 2.08 |
| G | 17.6 | 2.22 |

TABLE VII-B

| Current density | A | B | C | D | E | F | G |
|---|---|---|---|---|---|---|---|
| 0 | 0.878 | 0.908 | 0.898 | 0.901 | 0.883 | 0.917 | 0.903 |
| 5 | 0.700 | 0.792 | 0.809 | 0.817 | 0.787 | 0.855 | 0.819 |
| 10 | 0.586 | 0.716 | 0.747 | 0.759 | 0.725 | 0.798 | 0.763 |
| 30 | 0.309 | 0.559 | 0.673 | 0.639 | 0.562 | 0.675 | 0.651 |
| 50 | 0.128 | 0.431 | 0.524 | 0.564 | 0.466 | 0.607 | 0.586 |
| 70 | | 0.320 | 0.427 | 0.493 | 0.399 | 0.553 | 0.525 |
| 90 | | 0.216 | 0.344 | 0.435 | 0.349 | 0.508 | 0.476 |
| 100 | | 0.175 | 0.315 | 0.405 | 0.325 | 0.485 | 0.449 |
| 120 | | | 0.236 | 0.353 | 0.286 | 0.444 | 0.405 |
| 150 | | | | 0.274 | 0.223 | 0.374 | 0.335 |
| 200 | | | | 0.166 | 0.143 | 0.291 | 0.227 |
| 250 | | | | | | 0.235 | 0.158 |
| 300 | | | | | | 0.193 | |

Example 8

This example illustrates the use of other alkanes as fuels with A, the azetrope of hydrogen fluoride and water at 110° C., and B, the electrolyte having the composition of E of Example 7 at a temperature of 150° C. The results given in Table VIII show the current density of each of these fuels at a constant voltage of 0.4 volt. These results exclude the internal resistance of the cell.

TABLE VIII

| Fuel | Current density | |
|---|---|---|
| | A | B |
| Methane | 24 | 52 |
| Ethane | 44 | |
| Propane | 50 | 77 |
| Butane | 41 | 70 |
| Pentane | 44 | |
| Hexane | 13 | 45 |
| Octane | 3 | 42 |
| Decane | 3 | |
| Hexadecane | 3 | |

Similar results are obtained when an equivalent amount of rubidium fluoride is substituted for cesium fluoride in the above examples.

In obtaining the results of the above examples, samples of the effluent fuel gas were sampled for many of the fuels and analyzed for carbon dioxide while the cell was operated under constant load for an extended period of time. In all cases, the rate of carbon dioxide production agreed within experimental error with the theoretical amount which should have been produced for the fuel consumed to produce the rate of current produced. No other cell by-products were observed in the effluent gas or electrolyte, showing that the fluid, saturated hydrocarbon fuels consumed were being converted completely to carbon dioxide.

The results of the above examples clearly show that my fuel cells are capable of operating at very high current densities without encountering a maximum current density. For more efficient conversion of fuel into electricity, it is usually desirable to operate the fuel cell at a somewhat higher voltage than can be obtained when operated at the maximum power capability of the cell. The choice of this voltage is dependent on design and intended use of the fuel cell. As demonstrated by the examples, for any given voltage, conditions can be chosen to maximize the current density and thus the amount of power that can be produced at this voltage and yet provide a reserve of power to meet any power overloads without encountering a maximum current density. My invention has therefore provided a fuel cell which can be operated at any desired efficiency, at power levels heretofore unobtainable with fluid, saturated hydrocarbon fuels.

The procedures given in the above examples are not limited to the particular metal catalysts described. Other catalytically active metals previously described may be used as well.

Other modifications of this invention and variations in the structure may be employed without departing from the scope of the invention. For example, the shape of the cell may be varied and may be conveniently chosen to fit into an existing space. Two or more of these cells may be joined together to produce batteries.

The fuel cells of this invention may be used for any application where a reliable source of direct current electric power is required to activate motors, instruments, radio transmitters, lights, heaters, etc. The power from the fuel cells may also be used to drive a thermoelectric refrigerator which requires a low voltage source of direct current.

These and other modifications of this invention which will be readily discernible to those skilled in the art, may be employed within the scope of the invention. The invention is intended to include all such modifications and variations as may be embraced within the following claims.

What I claim as new and desire to secure by Letters Patent of the United States is:

1. A process of producing electrical energy from a fluid, saturated hydrocarbon fuel which comprises bringing said fuel in direct contact with one of the two major surfaces of a fuel cell electrode element, bringing an oxidant gas in direct contact with one of the two major surfaces of another fuel cell electrode element, said electrode elements having their other major surface in direct electrical contact with an electrolyte maintained at a temperature of from 80° C. up to the boiling point of the electrolyte at the ambient pressure above the electrolyte whose composition, on a mole percentage basis, is (A) 4–90% water, (B) 10–81% hydrogen fluoride, and when the ratio of (B) divided by the sum of (A) and (B) exceeds the percentage of hydrogen fluoride in the azeotrope of hydrogen fluoride and water and the temperature exceeds the boiling point of the azeotrope of hydrogen fluoride and water at the ambient pressure above the electrolyte, there is present, as a suppressor for the hydrogen fluoride vapor pressure, (C) 15–48%, but not exceeding the percentage of the hydrogen fluoride, of at least one metal fluoride selected from the group consisting of cesium fluoride and rubidium fluoride, the sum of (A), (B) and (C) being 100%.

2. A process of claim 1 wherein the metal fluoride is cesium fluoride.

3. The process of producing electrical energy from a fluid, saturated hydrocarbon fuel which comprises bringing said fuel in direct contact with one of the two major surfaces of a fuel cell electrode element, bringing an oxidant gas in direct contact with one of the two major surfaces of another fuel cell electrode element, said electrode elements having their other major surface in direct electrical contact with an electrolyte maintained at a temperature of from 80° C. up to the boiling point of the electrolyte at the ambient pressure above the electrolyte whose composition consists essentially of water and hydrogen fluoride; whose hydrogen fluoride content, on a mole percentage basis, is from 10% up to the percentage of hydrogen fluoride in the azeotrope of water and hydrogen fluoride at the ambient pressure above the electrolyte.

4. The process of producing electrical energy from a fluid, saturated hydrocarbon fuel which comprises bringing said fuel in direct contact with one of the two major surfaces of a fuel cell electrode element, bringing an oxidant gas into direct contact with one of the two major surfaces of another fuel cell electrode element, said electrode elements having their other major surface in direct electrical contact with an electrolyte maintained at a temperature higher than the boiling point of the azeotrope of hydrogen fluoride and water but not greater than the boiling point of the electrolyte at the ambient pressure above the electrolyte whose composition, on a mole percentage basis, is (A) 4–53% water, (B) 27–81% hydrogen fluoride, the ratio of (B) divided by the sum of (A) and (B) being greater than the percentage of hydrogen fluoride in the azeotrope of hydrogen fluoride and water, and (C) 15–48%, but not exceeding the percentage of hydrogen fluoride, of at least one metal fluoride selected from the group consisting of cesium fluoride and rubidium fluoride, the sum of (A), (B) and (C) being 100%.

5. The process of claim 4 wherein the metal fluoride is cesium fluoride.

6. A fuel cell for converting fluid, saturated hydrocarbon fuels to electrical energy at a temperature of from 80° C. up to the boiling point of the electrolyte at the ambient pressure above the electrolyte, comprising (1) a pair of fuel cell electrode elements, (2) means for supplying a fluid, saturated hydrocarbon fuel to one of said electrode elements and means for supplying an oxidant gas to the other said electrode element and (3) an electrolyte positioned between and in direct electrical contact with said electrode elements, said electrolyte having a composition, on a mole percentage basis, of (A) 4–90% water, (B) 10–81% hydrogen fluoride and, when the ratio of (B) divided by the sum of (A) plus (B) exceeds the percentage of hydrogen fluoride in the azeotrope of hydrogen fluoride and water, there is present, as a suppressor for the hydrogen fluoride vapor pressure, (C) 15–48%, but not exceeding the percentage of hydrogen fluoride, of at least one metal fluoride selected from the group consisting of cesium fluoride and rubidium fluoride, the sum of (A), (B) and (C) being 100%.

7. A fuel cell for converting fluid, saturated hydrocarbon fuels to electrical energy at a temperature of from 80° C. up to the boiling point of the electrolyte at the ambient pressure above the electrolyte, comprising (1) a pair of fuel cell electrode elements, (2) means for supplying a fluid, saturated hydrocarbon fuel to one of said electrode elements and means for supplying an oxidant gas to the other said electrode element, and (3) an electrolyte positioned between and in direct electrical contact with said electrode elements, said electrolyte having a composition consisting essentially of water and hydrogen fluoride, whose hydrogen fluoride content, on a mole percentage basis, is from 10% up to the percentage of hydrogen fluoride in the azeotrope of water and hydrogen fluoride.

8. A fuel cell for converting fluid, saturated hydrocarbon fuels to electrical energy at a temperature higher than the boiling point of the azeotrope of water and hydrogen fluoride but no greater than the boiling point of the electrolyte at the ambient pressure above the electrolyte, comprising (1) a pair of fuel cell electrode elements, (2) means for supplying a fluid, saturated hydrocarbon fuel to one of said electrode elements and means for supplying an oxidant gas to the other said electrode element and (3) an electrolyte positioned between and in direct electrical contact with said electrode elements, said electrolyte having a composition, on a mole percentage basis, of (A) 4–53% water, (B) 27–81% hydrogen fluoride, the ratio of (B) divided by the sum of (A) and (B) being greater than the percentage of hydrogen fluoride in the azeotrope of hydrogen fluoride and water, and (C) 15–48%, but not exceeding the percentage of hydrogen fluoride, of at least one metal fluoride selected from the group consisting of cesium fluoride and rubidium fluoride, the sum of (A), (B) and (C) being 100%.

9. The fuel cell of claim 8 wherein the metal fluoride is cesium fluoride.

References Cited

UNITED STATES PATENTS

| | | | |
|---|---|---|---|
| 3,279,949 | 10/1966 | Shaefer et al. | 136—86 |
| 3,098,772 | 7/1963 | Taschek | 136—86 X |

WINSTON A. DOUGLAS, *Primary Examiner.*

M. J. ANDREWS, *Assistant Examiner.*

U.S. Cl. X.R.

136—155